US007877580B2

(12) United States Patent
Eickemeyer et al.

(10) Patent No.: US 7,877,580 B2
(45) Date of Patent: Jan. 25, 2011

(54) BRANCH LOOKAHEAD PREFETCH FOR MICROPROCESSORS

(75) Inventors: Richard James Eickemeyer, Rochester, MN (US); Hung Qui Le, Austin, TX (US); Dung Quoc Nguyen, Austin, TX (US); Benjamin Walter Stolt, Austin, TX (US); Brian William Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 11/953,799

(22) Filed: Dec. 10, 2007

(65) Prior Publication Data

US 2008/0091928 A1 Apr. 17, 2008

Related U.S. Application Data

(63) Continuation of application No. 11/016,200, filed on Dec. 17, 2004, now Pat. No. 7,552,318.

(51) Int. Cl.
*G06F 9/00* (2006.01)
(52) U.S. Cl. .................................... 712/219; 712/237
(58) Field of Classification Search ................. 712/219, 712/237
See application file for complete search history.

(56) References Cited

U.S. PATENT DOCUMENTS

| 5,471,626 | A  | 11/1995 | Carnevale et al. |
|-----------|----|---------|------------------|
| 5,758,051 | A  | 5/1998  | Moreno et al.    |
| 5,974,538 | A  | 10/1999 | Wilmot, II       |
| 5,987,594 | A  | 11/1999 | Panwar et al.    |
| 6,356,918 | B1 | 3/2002  | Chuang et al.    |
| 6,427,207 | B1 | 7/2002  | Col et al.       |
| 6,430,683 | B1 | 8/2002  | Arimilli et al.  |
| 6,473,837 | B1 | 10/2002 | Hughes et al.    |
| 6,950,925 | B1 | 9/2005  | Sander et al.    |
| 7,114,060 | B2 | 9/2006  | Chaudhry et al.  |
| 7,194,604 | B2 | 3/2007  | Bigelow et al.   |
| 7,257,699 | B2 | 8/2007  | Chaudhry et al.  |
| 7,376,794 | B2 | 5/2008  | Steely, Jr. et al. |

(Continued)

OTHER PUBLICATIONS

Balasubramonian et al., "Dynamically Allocating Processor Resources between Nearby and Distant ILP," ACM SIGARCH Computer Architecture News pp. 26-37 (May 2001).

*Primary Examiner*—Alford W Kindred
*Assistant Examiner*—Benjamin P Geib
(74) *Attorney, Agent, or Firm*—Matthew Ealpis; Jack V. Musgrove

(57) ABSTRACT

A method of handling program instructions in a microprocessor which reduces delays associated with mispredicted branch instructions, by detecting the occurrence of a stall condition during execution of the program instructions, speculatively executing one or more pending instructions which include at least one branch instruction during the stall condition, and determining the validity of data utilized by the speculative execution. Dispatch logic determines the validity of the data by marking one or more registers of an instruction dispatch unit to indicate which results of the pending instructions are invalid. The speculative execution of instructions can occur across multiple pipeline stages of the microprocessor, and the validity of the data is tracked during their execution in the multiple pipeline stages while monitoring a dependency of the speculatively executed instructions relative to one another during their execution in the multiple pipeline stages.

9 Claims, 5 Drawing Sheets

U.S. PATENT DOCUMENTS

| | | |
|---|---|---|
| 7,421,567 B2 | 9/2008 | Eickemeyer et al. |
| 7,444,498 B2 | 10/2008 | Eickemeyer et al. |
| 7,490,229 B2 * | 2/2009 | Tremblay et al. ........... 712/239 |
| 2003/0126406 A1 | 7/2003 | Hammarlund et al. |
| 2005/0055541 A1 | 3/2005 | Aamodt et al. |
| 2005/0223200 A1 | 10/2005 | Tremblay et al. |

* cited by examiner

BRANCH LOOKAHEAD PREFETCH FOR MICROPROCESSORS

CROSS-REFERENCE TO RELATED APPLICATION

The present application is a continuation of U.S. patent application Ser. No. 11/016,200 filed Dec. 17, 2004 now U.S. Pat. No. 7,552,318, and is related to U.S. patent application Ser. No. 11/016,236 filed Dec. 17, 2004, and U.S. patent application Ser. No. 11/016,206 filed Dec. 17, 2004, each of which is hereby incorporated.

BACKGROUND OF THE INVENTION

1. Field of the Invention

The present invention generally relates to computer systems, and more particularly to an improved method of handling program instructions in a processor and to an improved processor design.

2. Description of the Related Art

High-performance computer systems use multiple processors to carry out the various program instructions embodied in computer programs such as software applications and operating systems. A typical multi-processor system 10 is shown in FIG. 1. Computer system 10 has one or more processing units arranged in one or more processor groups; in the depicted system, there are four processing units 12a, 12b, 12c and 12d in processor group 14. The processing units communicate with other components of system 10 via a system or fabric bus 16. Fabric bus 16 is connected to a system memory 20, and various peripheral devices 22. Service processors 18a, 18b are connected to processing units 12 via a JTAG interface or other external service port. A processor bridge 24 can optionally be used to interconnect additional processor groups. System 10 may also include firmware (not shown) which stores the system's basic input/output logic, and seeks out and loads an operating system from one of the peripherals whenever the computer system is first turned on (booted).

System memory 20 (random access memory or RAM) stores program instructions and operand data used by the processing units, in a volatile (temporary) state. Peripherals 22 may be connected to fabric bus 16 via, e.g., a peripheral component interconnect (PCI) local bus using a PCI host bridge. A PCI bridge provides a low latency path through which processing units 12a, 12b, 12c and 12d may access PCI devices mapped anywhere within bus memory or I/O address spaces. PCI host bridge 22 also provides a high bandwidth path to allow the PCI devices to access RAM 20. Such PCI devices may include a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and a graphical pointing device (mouse) for use with the display device.

In a symmetric multi-processor (SMP) computer, all of the processing units 12a, 12b, 12c and 12d are generally identical, that is, they all use a common set or subset of instructions and protocols to operate, and generally have the same architecture. As shown with processing unit 12a, each processing unit may include one or more processor cores 26a, 26b which carry out program instructions in order to operate the computer. An exemplary processor core includes the Power5™ processor marketed by International Business Machines Corp., which comprises a single integrated circuit superscalar microprocessor having various execution units (fixed-point units, floating-point units, and load/store units), registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Each processor core 26a, 26b may include an on-board (L1) cache (typically separate instruction cache and data caches) implemented using high speed memory devices. Caches are commonly used to temporarily store values that might be repeatedly accessed by a processor, in order to speed up processing by avoiding the longer step of loading the values from system memory 20. A processing unit can include another cache, i.e., a second level (L2) cache 28 which, along with a memory controller 30, supports both of the L1 caches that are respectively part of cores 26a and 26b. Additional cache levels may be provided, such as an L3 cache 32 which is accessible via fabric bus 16. Each cache level, from highest (L1) to lowest (L3) can successively store more information, but at a longer access penalty. For example, the on-board L1 caches in the processor cores might have a storage capacity of 128 kilobytes of memory, L2 cache 28 might have a storage capacity of 512 kilobytes, and L3 cache 32 might have a storage capacity of 2 megabytes. To facilitate repair/replacement of defective processing unit components, each processing unit 12a, 12b, 12c, 12d may be constructed in the form of a replaceable circuit board or similar field replaceable unit (FRU), which can be easily swapped installed in or swapped out of system 10 in a modular fashion.

Within a pipeline superscalar processor, instructions are first fetched, decoded and then buffered. Instructions can be dispatched to execution units as resources and operands become available. Additionally, instructions can be fetched speculatively based on predictions about branches taken. The result is a pool of instructions in varying stages of execution, none of which have completed by writing final results to the system memory hierarchy. As resources become available and branches are resolved, the instructions are retired in program order, thus preserving the appearance of a machine that executes the instructions in program order. Overall instruction throughput can be further improved by modifying the hardware within the processor, for example, by having multiple execution units in a single processor core. In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as a predefined rules are satisfied. Microprocessors may provide varying levels of out-of-order execution support, meaning that the ability to identify and execute instructions out-of-order may be limited.

One major motivation for limiting out-of-order execution support is the enormous complexity that is required to identify which instructions can execute early, and to track and store the out-of-order results. Additional complexities arise when the instructions executed out-of-order are determined to be incorrect per the in-order execution model, requiring their execution to not impact the architected state of the processor when an older instruction causes an exception. As processor speeds continue to increase, it becomes more attractive to eliminate some of the complexities associated with out-of-order execution. This change will eliminate logic (and its corresponding chip area, or "real estate") from the chip which is normally used to track out-of-order instructions, thereby allowing additional real estate to become available for use by other processing functions.

A typical instruction stream is non-linear, since there are many branches in the code. A branch instruction selects one of two paths depending upon certain previously computed results. Since the next instruction address cannot be fully resolved until the branch is actually executed, there would usually be a long stall between the branch and the next instruction. As mentioned above, modem processors implement some form of prediction to speculatively fetch the instructions after the branch, in most cases eliminating this stall altogether. However, no such mechanism is perfect so there will inevitably be cases where the incorrect instructions were fetched into the machine and some form of time-consuming corrective action is required to ensure that only the right instructions are executed. During this time, no forward progress can be made.

This hindrance is further exacerbated by other delays that can occur during instruction dispatch. For example, the system might enter a stall condition for reasons other than branch misprediction, such as for a load cache "miss" which occurs when data required by an instruction is not available in a level one (L1) cache and the microprocessor is forced to wait until the data can be retrieved from a slower cache, or main memory. Obtaining data from main memory is a relatively slow operation, and when out-of-order execution is limited due to aforementioned complexities subsequent instructions cannot be fully executed until valid data is received from memory.

More particularly, an older instruction that takes a long time to execute can create a stall that may prevent any younger or subsequent instructions, including branch instructions, from executing until the time-consuming instruction completes. Without facilities to support all out-of-order execution scenarios, it is not normally possible to change instruction ordering such that forward progress through the instruction stream can be made while the missed data is retrieved.

In light of the foregoing, it would be desirable to devise an improved method of handling incorrect branch predictions. It would be further advantageous if the method could reduce delays associated with branch misprediction in microprocessors with reduced or limited support for out of order execution by identifying and executing branches in the instruction stream during a stall conditions without changing the architected state of the machine.

SUMMARY OF THE INVENTION

It is therefore one object of the present invention to provide an improved method of handling program instructions in a computer processor.

It is another object of the present invention to provide such a method which reduces delays associated with incorrect branch predictions.

It is yet another object of the present invention to provide a method and system for reducing the overall performance impact of mispredicted branches and other stall conditions.

The foregoing objects are achieved in a method of handling program instructions in a microprocessor by detecting the occurrence of a stall condition during execution of program instructions that would normally have stalled the thread of execution, speculatively executing one or more pending instructions which include at least one branch instruction during the stall condition, and conditioning the execution or effect of these instructions based on the determination of the validity of data utilized by these instructions. In particular, the method can detect a load instruction miss which results in the stall condition. The invention is particularly suited for processors with limited out-of-order execution support where, under certain stall conditions, pending instructions may not be completed until previously dispatched pending instructions have been completed. The dispatch logic and execution units can determine the validity of the data used by the speculatively executed instructions by marking one or more registers of an instruction dispatch unit to indicate which results of the pending instructions are invalid. In the illustrative embodiment wherein the processor has multiple pipeline stages, the speculative execution of instructions occurs across the pipeline stages, and the validity of the data is tracked during their execution in the multiple pipeline stages while monitoring a dependency of the speculatively executed instructions relative to one another during their execution in the multiple pipeline stages. A branch prediction unit predicts a path of the branch instruction prior to detection of the stall condition, and fetches speculative instructions from the predicted path into an instruction queue. If the speculative execution of the branch instruction indicates it was mispredicted, the speculative instructions following the branch are flushed from the pipeline and instruction queue, the branch prediction information is updated based on results of the speculative execution of the branch instruction, and the instructions at the resolved target of the branch are fetched and loaded into the instruction queue, allowing the branch to execute without incurring a misprediction penalty when it is re-executed (i.e., non-speculatively executed) after the stall condition expires. The speculative execution of the instructions occurs without altering any architected facilities of the microprocessor.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
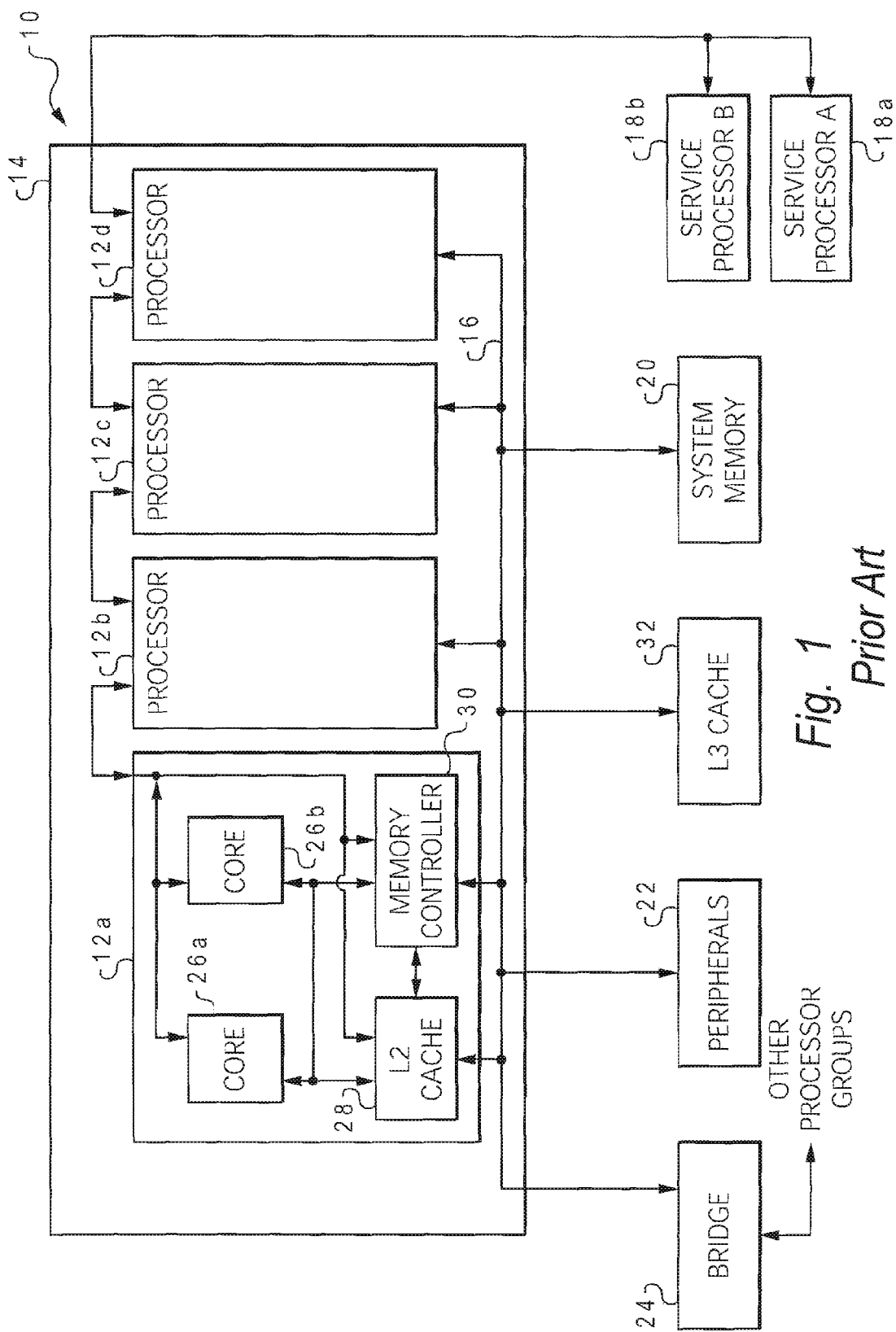
FIG. 1 is a block diagram depicting a conventional symmetric multi-processor (SMP) computer system, with internal details shown for one of the four generally identical processing units.
Figure 2:
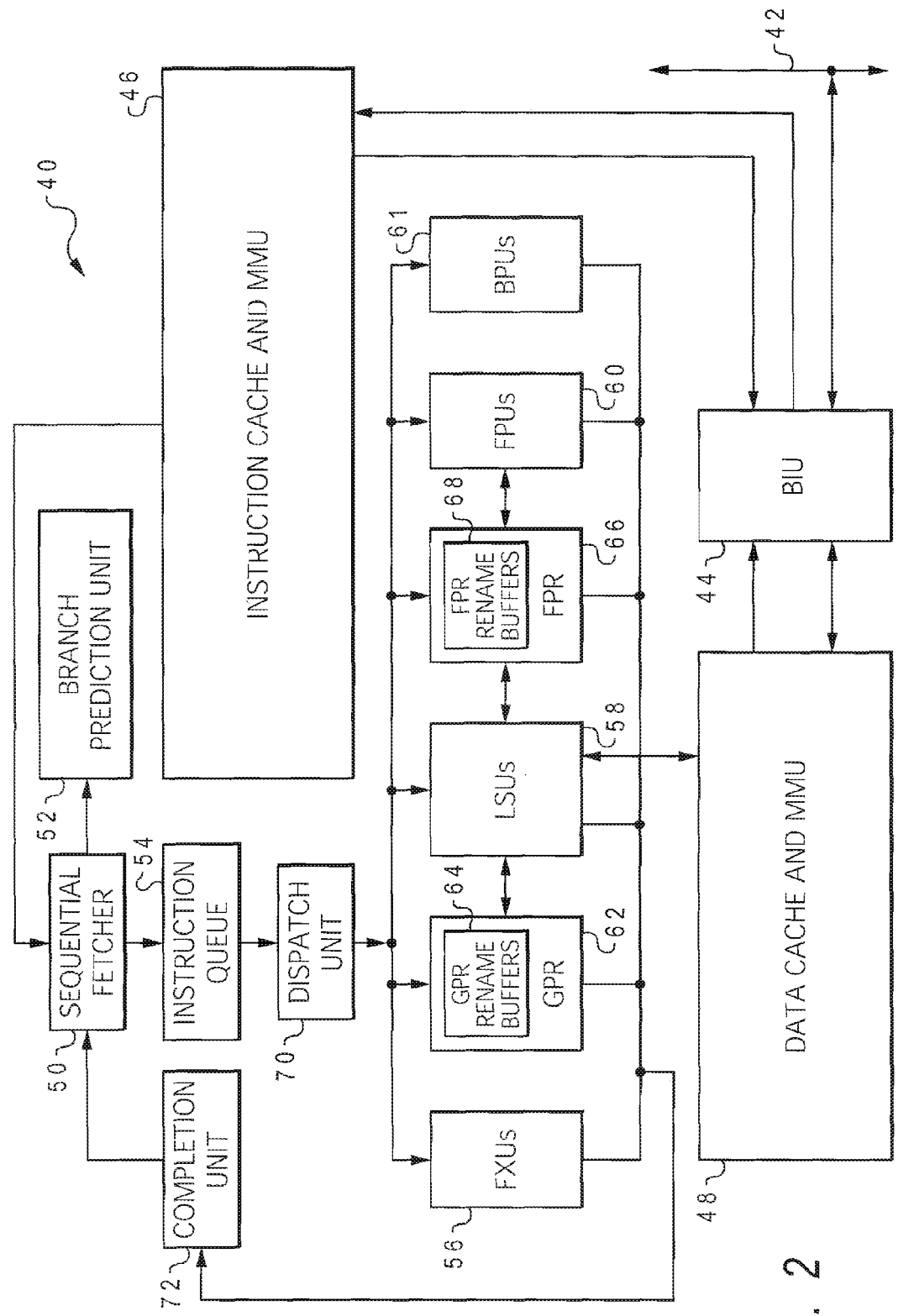
FIG. 2 is a block diagram of one embodiment of a computer processor constructed in accordance with the present invention, which has a branch lookahead prefetch mechanism to reduce delays associated with mispredicted branches.

With reference now to the figures, and in particular with reference to FIG. 2, there is depicted one embodiment 40 of a computer processor constructed in accordance with the present invention. Processor 40 is generally comprised of a single integrated circuit superscalar microprocessor, and includes various execution units, registers, buffers, memories, and other functional units (explained further below), which are all formed by integrated circuitry. Processor 40 may operate according to reduced instruction set computing (RISC) techniques. Processor 40 is coupled to a system or fabric bus 42 via a bus interface unit (BIU) 44 within processor 40. BIU 44 controls the transfer of information between processor 40 and other devices coupled to system bus 42, such as a main memory, by participating in bus arbitration. Processor 40, system bus 42, and the other devices coupled to system bus 42 together form a host data processing system. Those skilled in the art will appreciate that the present invention is not limited to the specific construction shown in FIG. 2, as some components may be omitted, other components may be added, or different interconnections provided while still affording the novel functionality disclosed herein.

BIU 44 is connected to an instruction cache and memory management unit (MMU) 46, and to a data cache and MMU 48 within processor 40. High-speed caches, such as those within instruction cache and MMU 46 and data cache and MMU 48, enable processor 40 to achieve relatively fast access time to a subset of data or instructions previously transferred from main memory to the caches, thus improving the speed of operation of the host data processing system. Instruction cache and MMU 46 is further coupled to a sequential fetcher 50, which fetches instructions for execution from instruction cache and MMU 46 during each cycle. Sequential fetcher 50 transmits branch instructions fetched from instruction cache and MMU 46 to a branch prediction unit 52 for calculating the next instruction fetch address, but temporarily stores sequential instructions within an instruction queue 54 for execution by other execution circuitry within processor 40.

The execution circuitry of processor 40 has multiple execution units for executing sequential instructions, including one or more fixed-point units (FXUs) 56, load-store units (LSUs) 58, floating-point units (FPUs) 60, and branch processing units (BPUs) 61. These execution units 56, 58, 60, and 61 execute one or more instructions of a particular type of sequential instructions during each processor cycle. For example, FXU 56 performs fixed-point mathematical and logical operations such as addition, subtraction, ANDing, ORing, and XORing, utilizing source operands received from specified general purpose registers (GPRs) 62 or GPR rename buffers 64. Following the execution of a fixed-point instruction, FXUs 56 output the data results of the instruction to GPR rename buffers 64, which provide temporary storage for the operand data until the instruction is completed by transferring the result data from GPR rename buffers 64 to one or more of GPRs 62. FPUs 60 perform single and double-precision floating-point arithmetic and logical operations, such as floating-point multiplication and division, on source operands received from floating-point registers (FPRs) 66 or FPR rename buffers 68. FPU 60 outputs data resulting from the execution of floating-point instructions to selected FPR rename buffers 68, which temporarily store the result data until the instructions are completed by transferring the result data from FPR rename buffers 68 to selected FPRs 66. LSUs 58 execute floating-point and fixed-point instructions which either load data from memory (i.e., either the data cache within data cache and MMU 48 or main memory) into selected GPRs 62 or FPRs 66, or which store data from a selected one of GPRs 62, GPR rename buffers 64, FPRs 66, or FPR rename buffers 68 to system memory. BPUs 61 perform condition code manipulation instructions and branch instructions.

Processor 40 may employ both pipelining and out-of-order execution of instructions to further improve the performance of its superscalar architecture, but the present invention is particularly advantageous when used with in-order program execution or in cases where out-of-order execution capabilities are limited. For out-of-order processing, instructions can be executed by FXUs 56, LSUs 58, FPUs 60, and BPUs 61 in any order as long as data dependencies are observed. In addition, instructions may be processed by each of the FXUs 56, LSUs 58, FPUs 60, and BPUs 61 at a sequence of pipeline stages, in particular, five distinct pipeline stages: fetch, decode/dispatch, execute, finish, and completion.

During the fetch stage, sequential fetcher 50 retrieves one or more instructions associated with one or more memory addresses from instruction cache and MMU 46. Sequential instructions fetched from instruction cache and MMU 46 are stored by sequential fetcher 50 within instruction queue 54. Sequential fetcher 50 folds out branch instructions from the instruction stream and forwards them to branch prediction unit 52 for handling. Branch prediction unit 52 includes a branch prediction mechanism, which may comprise a dynamic prediction mechanism such as a branch history table, that enables branch prediction unit 52 to speculatively execute unresolved conditional branch instructions by predicting whether or not the branch will be taken.

During the decode/dispatch stage, instruction dispatch unit (IDU) 70 decodes and dispatches one or more instructions from instruction queue 54 to execution units 56, 58, 60, and 61, as explained further below. In addition, dispatch unit 70 allocates a rename buffer within GPR rename buffers 64 or FPR rename buffers 68 for each dispatched instruction' result data. Upon dispatch, instructions are also stored within the multiple-slot completion buffer of completion unit 72 to await completion. Processor 40 tracks the program order of the dispatched instructions during out-of-order execution utilizing unique instruction identifiers.

During the execute stage, execution units 56, 58, 60, and 61, execute instructions received from dispatch unit 70 opportunistically as operands and execution resources for the indicated operations become available. Each of execution units 56, 58, 60, and 61, are preferably equipped with a reservation station that stores instructions dispatched to that execution unit until operands or execution resources become available. After execution of an instruction has terminated, execution units 56, 58, 60, and 61, store data results, if any, within either GPR rename buffers 64 or FPR rename buffers 68, depending upon the instruction type. Then, execution units 56, 58, 60, and 61, notify completion unit 72 which instructions have finished execution. Finally, instructions are completed in program order out of the completion buffer of completion unit 72. Instructions executed by FXUs 56 and FPUs 60 are completed by transferring data results of the instructions from GPR rename buffers 64 and FPR rename buffers 68 to GPRs 62 and FPRs 66, respectively. Load and store instructions executed by LSUs 58 are completed by transferring the finished instructions to a completed store queue or a completed load queue from which the indicated load/store operations will be performed.

Processor 40 utilizes a branch lookahead prefetch mechanism to reduce delays associated with incorrect branch predictions by branch prediction unit 52. When the machine detects an extended stall condition (for example, a load instruction missing an address translation or the data cache), the branch lookahead prefetch procedure is started and subsequent instructions in instruction queue 54 begin to be speculatively executed. The goal is to identify branches that can be preemptively resolved and, if a flush of the mispredicted instruction stream is necessary, cause the correct instruction stream to be fetched such that the correct branch path is available and the flush avoided when the branch is non-speculatively executed at a later point in time. These branches are identified by actually executing the branch instructions in a speculative manner.

Since data in this mode can be invalid and results may not be able to be stored once a speculative instruction completes (writeback cannot occur until the instruction causing the initial stall condition completes, so depending on implementation there may be no facility to store speculative results), it becomes necessary to track which results are invalid or "dirty" as well as how instructions are dependent on each other. A related invention described in U.S. patent application Ser. No. 11/016,236 filed Dec. 17, 2004, which addresses the stalls cause by load instructions, can also be used to define a mechanism to track most of this dependency information. In addition though, resources specific to branch resolution need to be tracked for validity. Both sources of information are used to decide whether or not the source operands for a given branch are valid and if a potential flush should be allowed to proceed.

Branch lookahead prefetch uses the dependency tracking information that the load lookahead prefetch can provide. Both mechanisms can coexist since they address different types of stalling conditions. For the exemplary implementation, branch lookahead prefetch is active whenever load lookahead prefetch is active, but an alternate method of providing dependency information could be used as well. Once active, branch lookahead prefetch accomplishes three things: tracking any dependency information specific to branch resolution (condition registers (CR), link registers (LR), etc.); allowing the execution of instructions that modify these resources without changing the architected state of the machine; and determining which branches are eligible to be executed and flushing where possible.

In order for instructions to be executed speculatively, their results must be prevented from being written back and changing the architected state of the machine. For purposes of example but not by way of limitation, this restriction is accomplished by sending a signal with each instruction dispatched under load/branch lookahead prefetch indicating that it should be treated as speculative. As long as it is not written to the architected registers, speculative data can be stored to a separate set of registers, a small cache or not stored at all (but up to the writeback point be forwarded to younger instructions). In any case, determining which branches are eligible for early execution requires instruction dependency and tracking the validity of the results.

Exactly where dependency information is traced can vary based on how a specific processor is implemented. In general, any resources that can be read or modified by more than one unit (for example, condition registers) are best tracked by the IDU since it is aware of all instruction information at dispatch time, but may also need to be tracked between units when inter-unit dependencies exist. Resources only used within one unit can be tracked in that unit or in the IDU. The branch lookahead prefetch procedure continues until the initial stall condition that started the load lookahead prefetch is resolved. Once this occurs, normal execution will restart at the stalled instruction. Any information about instruction validity tracked by the branch lookahead mechanism in IDU 70 is cleared at this time.

IDU 70 maintains a vector of dirty bits to keep track of which results are invalid as instructions complete. In addition to the bits maintained by the load lookahead mechanism, branch lookahead maintains dirty bits for any branch related registers (such as condition registers, LR, etc.). Alternative embodiments may maintain the vector of dirty bits in another location, e.g., within the execution units or with the architected facility whose validity is being tracked.

Figure 3:
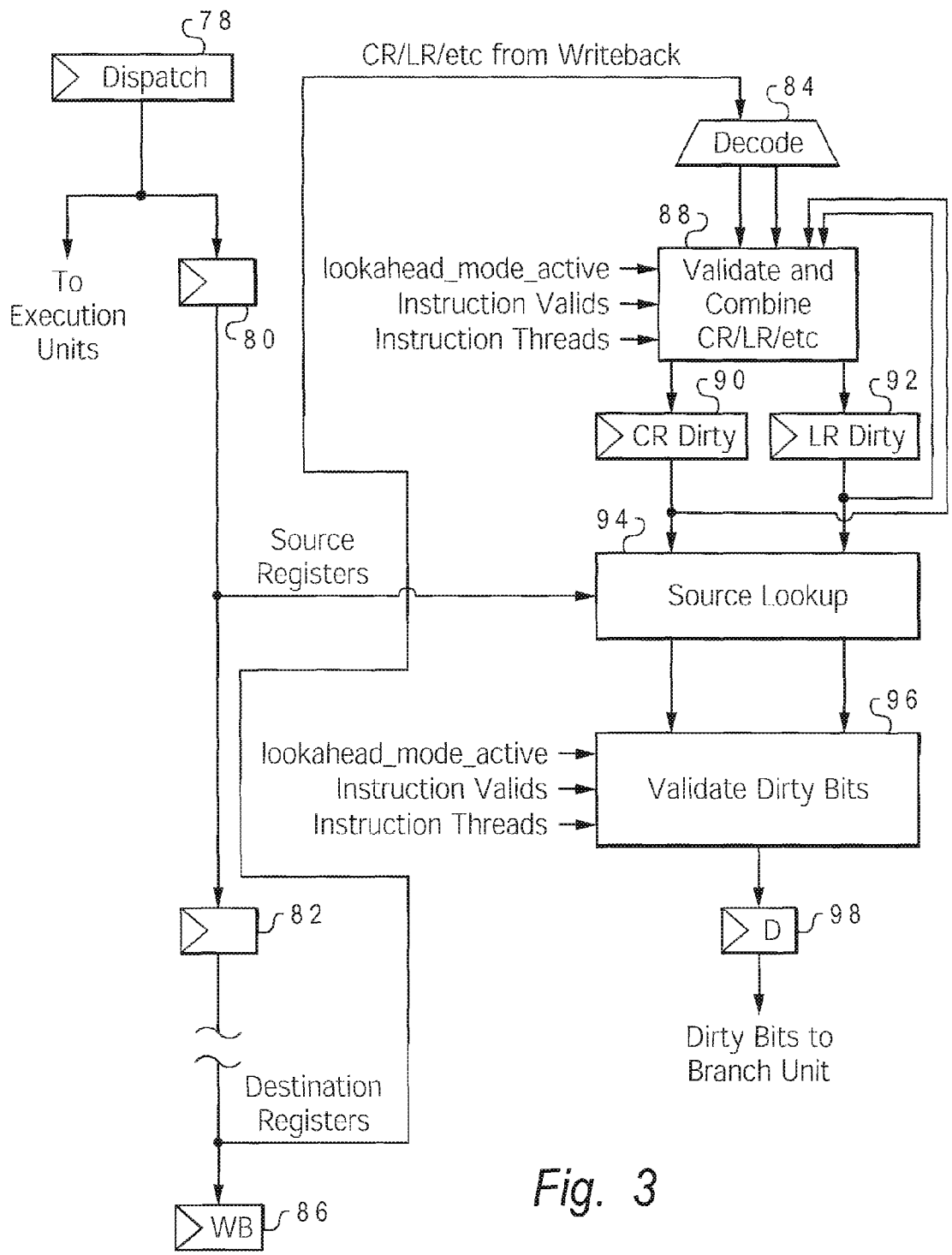
FIG. 3 is a flow diagram illustrating the checking and updating of certain registers in the instruction dispatch unit of FIG. 2 as part of the dependency validation that occurs with branch lookahead prefetch in accordance with one implementation of the present invention.

FIG. 3 shows the checking and updating functions associated with the CR and LR dirty vectors 90 and 92 in instruction dispatch unit 70. More specifically, CR dirty bit vector 90 and LR dirty bit vector 92 will be maintained to keep track of which results are no longer available for forwarding. The number of bits in dirty vectors 90, 92 depends on the number of architected condition registers present in the processor.

At dispatch time, every instruction that uses CR information will look up all of its source registers ($CR_A$ and $CR_B$) in CR dirty vector 90 to determine if any of these are to be considered invalid. The same is true for instructions that use the LR as a source, with dirty vector 92. Alternative embodiments may look up the dirty state of the register (or other architectural facility) vector at the time that the register is accessed. All of the bits in dirty bit vectors 90, 92 are initially set to "0" and these bits are set to "1" when the instructions pass the writeback stage. Source logic looks up the dirty bits in vectors 90, 92 for registers associated with the instructions being dispatched and a dirty bit is then forwarded to the functions units via latch 96. The instruction dirty bit in the functional unit (which is an indication that one or more data sources for an instruction are invalid) may be set in one of three ways: any method used by load lookahead (or any alternate method of tracking instruction dependencies) marks an instruction as dirty; source data is read from a branch-related forwarding path (CR, etc.) and that data is already marked as dirty; or the IDU indicates that a source operand is dirty based on a lookup in the CR/LR/etc. dirty vector.

The dirty bit is forwarded along with results to any dependent instruction. If an instruction uses multiple sources, the dirty bits can simply be logically ORed together. That is, if an instruction is using $CR_A$ and $CR_B$, then the dirty bits for these two registers are ORed together and if either bit is set then the data resulting from the execution of the instruction is considered invalid. The branch unit 61 will block flushes when it encounters a branch with its dirty bit set.

As instructions pass the point where their results are no longer available to younger instructions (for example, the writeback stage which is the point where results calculated by the execution units are provided to the architected registers), target registers are marked in the IDU's dirty vectors 90, 92 to indicate which results are invalid. The timing is such that the first instruction which is dependent on the previous result, but cannot receive the value via a forwarding path, will then be able to look up if the value is invalid in the dirty bit vector.

As shown in FIG. 3, instructions ready for dispatch are stored in latch 78 (within IDU 70) and then provided to another latch 80, as well as to the execution units. Validate and combine logic 88, via decode 84, also receives instructions from the writeback stage subsequent to latch 82 and prior to the instruction being provided to writeback latch 86. Validate and combine logic 88 determines if the instruction associated with the target register is considered invalid. This logic determines: (1) if the register is dirty based on whether branch lookahead prefetch mode is active; (2) whether the instruction is currently considered valid; and (3) whether there are multiple threads in the processor and which thread is current, i.e., the dirty bit needs to be written to the dirty bit vector of the correct thread. If the three previous considerations are true, the dirty bit for that instruction is set. The instructions are provided to source lookup logic 94 which examines the source registers (which are part of the instruction) and uses the dirty bit vectors 90, 92 to determine whether the data is valid. A logical "1" will be associated with the instruction being processed when the source data is invalid and a "0" will be associated with the instructions if then source data is valid. These bit values are merely exemplary and other patterns are contemplated by the scope of the present invention to indicate the validity of the instruction data. Dirty bit validation logic 215 then validates the dirty bit by determining whether the lookahead mode is active, the instruction is valid and whether the correct thread is being utilized. The dirty bit is then provided to latch 98 to be subsequently supplied to the instruction in the execution unit. It can be seen that the instruction is initially provided to both the dirty bit logic and the execution units. Once the dirty bit logic determines the appropriate state of the bit, it is then supplied to the instruction as it is proceeding through the execution pipeline.

In the branch execution unit, if the source information for a flush is dirty, the result of executing the branch is ignored and the predicted branch path is presumed valid. If the operands are valid the flush is executed. Flushes under branch lookahead differ from normal flushes due to the fact that they are effectively done out-of-order but without committing any architectural results and will be executed again when normal execution resumes. Since the flush will cause the instructions that were predicted to follow the branch to change, any prediction information that might have indicated which path was taken needs to be changed to reflect the updated instruction stream and prevent the flush from occurring again. In one embodiment the instruction buffer could contain a bit containing the predicted value of the condition register that is relevant to the branch instruction. Then when the actual value is determined to be different from the predicted value a flush would be required. Upon determining this under branch lookahead mode, the predicted bit would be changed to match the now corrected branch path. The way this prediction information is stored and the location of this information can vary by implementation, but the key factor is that it must be updated to reflect the change in the instruction stream if it is required for branch resolution.

During the time the branch instruction is being executed, the initial stall condition that triggered branch lookahead prefetch may have been resolved, so it becomes important to differentiate between normal instructions and those dispatched under lookahead mode when a flush occurs. This situation is handled by informing other units that the flush was caused by a speculative branch, so that flushing will only occur for instructions that are identified as speculative, i.e., those that were also marked with a lookahead bit. The determination of whether the branch has been speculatively executed is implementation dependent. In this manner, any instructions older than the branch are not affected.

As instructions pass to the writeback phase (where results are written to the architected registers), bits are marked in the IDU's dirty vector to indicate which results are invalid. The timing is such that the first instruction that could be dependent on the previous result, but can no longer receive that value via a forwarding path, will be able to look up if the value is dirty in the dirty vector instead.

Figure 4:
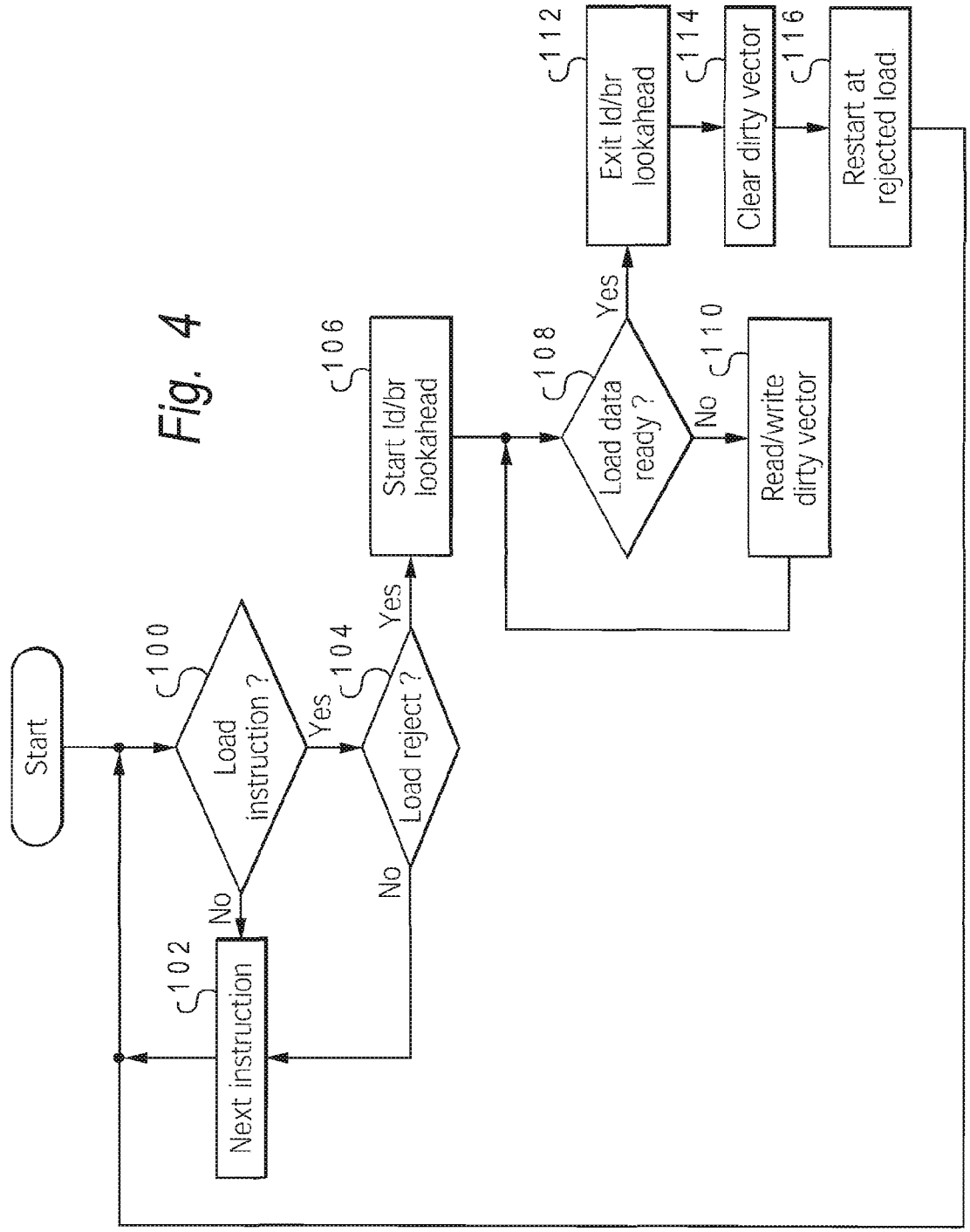
FIG. 4 is a chart depicting the logical flow for entering and exiting the lookahead procedure in accordance with one implementation of the present invention.

FIG. 4 is a flow chart showing when the load and branch lookahead prefetch mechanism of the present invention is entered and exited for a preferred embodiment in which a load cache miss is the extended stall condition for which speculative execution is initiated in an in-order microprocessor. The process starts by checking whether the current instruction is a load instruction (100). If not, the process waits for the next instruction (102), and a determination of whether the next instruction is a load occurs by looping back to step 100. However, if the current instruction is a load, then a determination is made as to whether a load reject has occurred such that a stall condition exists in the in-order microprocessor, such as a cache miss, address translation table miss, or the like (104). If there is no stall condition, then the process again loops back to step 102 and the microprocessor continues actual (non-speculative) instruction execution. If a stall condition does exist, the load and branch lookahead prefetch methods are initiated (106). It is then determined if the data to be loaded is ready (108) and, if not, the dirty bit vectors are updated for any instructions passing the write back stage (110). More particularly, all instructions that modify the CR or LR will write to the dirty bit vectors to indicate that results were not written to architected facilities. That is, there is no writeback allowed to the architected registers in the branch lookahead mode of the present invention. At the same time, any instruction, which seeks to use the data in a particular CR or LR register will read the dirty bit vector to determine if the data is valid and can be used. All instructions will write dirty bits and read dirty bits by receiving (reading) forwarded dirty bits from older instructions, or forwarding (writing) dirty bits to younger instructions. After updating the dirty vector, the process loops back to step 108 until the data to be loaded is ready. Once the load data is ready, the load and branch lookahead methods are exited (112) and all dirty bits are cleared (114). The load operation is then restarted (116) to reload the data that was initially rejected at 104.

Figure 5:
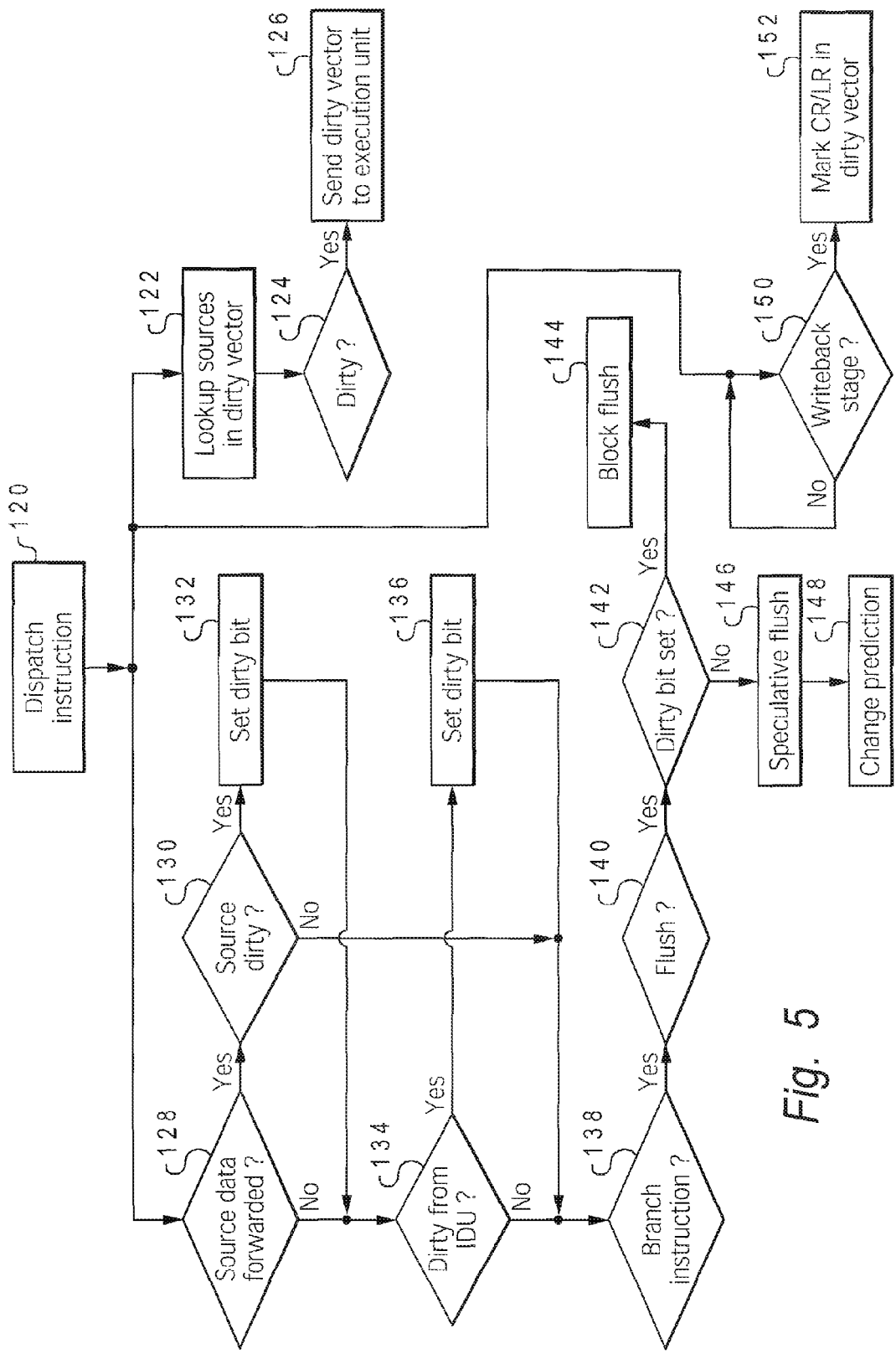
FIG. 5 is a chart depicting the instruction flow during a branch lookahead prefetch in accordance with one implementation of the present invention.

The overall instruction flow for a branch lookahead prefetch is shown in FIG. 5, and begins with dispatch of the instruction (120). The dirty vector for the instruction is examined to check the validity of the sources (122). If any bits are marked as dirty (124), they are forwarded to the corresponding execution unit (126). In the execution unit, a check is made to determine if the source operand data was forwarded (128). If so, the data dependency is further examined (130), and if the source data is dirty, its corresponding dirty bit is set (132). If the source operands are determined to not come from a forwarded result, that is, they are reached from architected facilities, any dirty bit sent from the IDU is used to set a dirty bit (134, 136). If the instruction is a branch instruction (138), a determination is made as to whether a flush is required (140). If the instruction is not a branch instruction or does not flush, no further action is necessary within the execution unit. If the initial determination is that a flush is necessary, the dirty bit for the instruction is further examined (142). If the dirty bit is set, the flush is blocked (144). If not, the flush proceeds speculatively (146), and the prediction information is updated (148).

When the instruction has progressed to the writeback stage (150), any registers that the instruction would write (these are blocked from being written under branch lookahead mode) are marked as dirty in the corresponding dirty vector in the IDU (152).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for speculatively executing program instructions in a microprocessor having execution units which commit results of non-speculative instructions to architected registers, comprising:
   detecting the occurrence of a stall condition during execution of the program instructions;
   speculatively executing one or more pending instructions which include at least one branch instruction during the stall condition, wherein said speculative executing occurs across multiple pipeline stages within the microprocessor;
   maintaining a vector of dirty bits to track the validity of the data for the speculatively executed instructions during their execution in the multiple pipeline stages of the microprocessor, wherein dirty bits in the vector are initially set to "0" and a given one of the dirty bits is set to "1" when an instruction passes a writeback stage where an invalid result calculated by one of the execution units is provided to a corresponding one of the architected registers; and
   monitoring a dependency of the speculatively executed instructions relative to one another during their execution in the multiple pipeline stages of the microprocessor.

2. The method of claim 1 wherein the stall condition is a load instruction miss.

3. The method of claim 1 wherein the pending instructions are completed in-order, with no pending instruction being completed until previously dispatched pending instructions have been completed.

4. The method of claim 1 further comprising marking one or more registers of an instruction dispatch unit to indicate which results of the pending instructions are invalid.

5. The method of claim 1 further comprising:
   predicting a path of the branch instruction prior to said detecting of the occurrence of the stall condition; and
   fetching speculative instructions from the predicted path into an instruction queue.

6. The method of claim 5 further comprising flushing the speculative instructions from the instruction queue in response to said executing of the branch instruction.

7. The method of claim 6 further comprising updating branch prediction information based on results of said executing of the branch instruction.

8. The method of claim 1 wherein said speculative executing of the instructions occurs within a plurality of functional units of the microprocessor.

9. The method of claim 1 wherein said speculative executing of the instructions occurs without altering any architected facilities of the microprocessor.

* * * * *